(12) United States Patent
Czyzyk

(10) Patent No.: US 12,150,594 B2
(45) Date of Patent: Nov. 26, 2024

(54) ADJUSTABLE FOOD PROCESSING SYSTEM

(71) Applicant: Don Czyzyk, Santa Clara, CA (US)

(72) Inventor: Don Czyzyk, Santa Clara, CA (US)

( * ) Notice: Subject to any disclaimer, the term of this patent is extended or adjusted under 35 U.S.C. 154(b) by 701 days.

(21) Appl. No.: 17/486,630

(22) Filed: Sep. 27, 2021

(65) Prior Publication Data

US 2022/0095843 A1   Mar. 31, 2022

Related U.S. Application Data

(60) Provisional application No. 63/074,618, filed on Sep. 25, 2020.

(51) Int. Cl.
| | | |
|---|---|---|
| *A47J 43/07* | (2006.01) | |
| *A47J 43/046* | (2006.01) | |
| *B02C 18/12* | (2006.01) | |
| *B02C 18/24* | (2006.01) | |

(52) U.S. Cl.
CPC ......... *A47J 43/0722* (2013.01); *A47J 43/046* (2013.01); *B02C 18/12* (2013.01); *B02C 18/24* (2013.01)

(58) Field of Classification Search
CPC ........ B02C 18/12; B02C 18/24; A47J 43/046; A47J 43/0722
See application file for complete search history.

(56) References Cited

U.S. PATENT DOCUMENTS

| | | | |
|---|---|---|---|
| 11,629,752 B2* | 4/2023 | Carr ................... | A47J 43/046 |
| | | | 384/482 |
| 2018/0344089 A1* | 12/2018 | Krus ................... | A47J 19/04 |
| 2019/0174960 A1* | 6/2019 | Hannemann ......... | A47J 43/046 |
| 2019/0254480 A1* | 8/2019 | Charopoulos ........ | A47J 43/046 |
| 2019/0343335 A1* | 11/2019 | Charopoulos ........ | A47J 43/046 |
| 2020/0344086 A1* | 10/2020 | Kraut-Reinkober .... | A47J 36/32 |
| 2021/0022554 A1* | 1/2021 | Kolar ................... | A47J 43/0727 |
| 2021/0100400 A1* | 4/2021 | Lee ..................... | A47J 43/046 |
| 2021/0186267 A1* | 6/2021 | Hammond ............. | A47J 43/046 |
| 2021/0220785 A1* | 7/2021 | Ambrose .............. | A47J 43/046 |
| 2021/0246936 A1* | 8/2021 | Carr .................... | A47J 43/0716 |
| 2021/0259471 A1* | 8/2021 | Siu ...................... | B02C 18/18 |
| 2022/0040652 A1* | 2/2022 | Schandel ............. | A47J 43/0722 |
| 2022/0087481 A1* | 3/2022 | Son ..................... | A47J 43/046 |
| 2022/0400904 A1* | 12/2022 | Zhou ................... | A47J 43/0722 |
| 2023/0276994 A1* | 9/2023 | Moon .................. | A47J 43/0722 |
| | | | 241/282.1 |
| 2023/0277004 A1* | 9/2023 | Aditjandra ............ | A47J 43/046 |
| | | | 366/314 |
| 2024/0278256 A1* | 8/2024 | Liao .................... | B02C 18/067 |

\* cited by examiner

*Primary Examiner* — Sean M Michalski

(57) ABSTRACT

An adjustable food processing system is provided comprising a food item container comprising a drive shaft sheath. The system may comprise an elongate shaft comprising a drive shaft cavity disposed therein, wherein a handling knob is disposed upon the elongate shaft, and the drive shaft cavity is disposed along a common vertical axis. Further, the system may comprise a drive mechanism comprising a drive shaft, wherein the drive shaft is shaped complimentary to a shape of the drive shaft cavity, and the drive shaft is disposed along the common vertical axis. The system may further comprise a lid comprising an aperture centered about the common vertical axis.

20 Claims, 3 Drawing Sheets

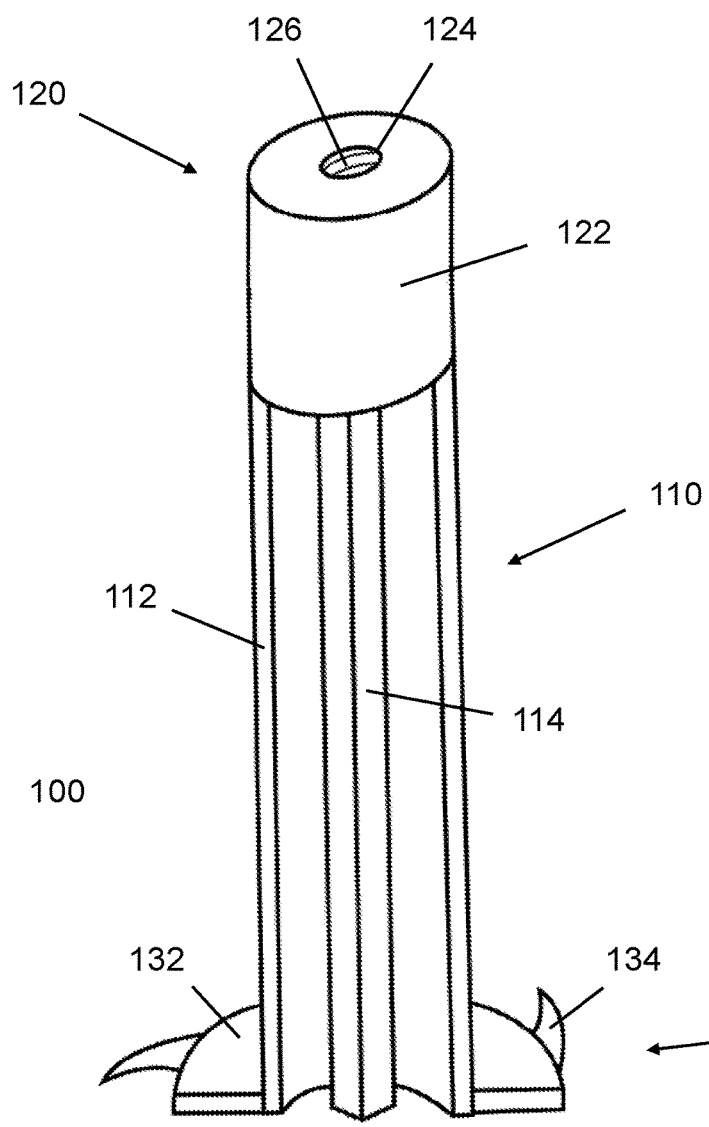
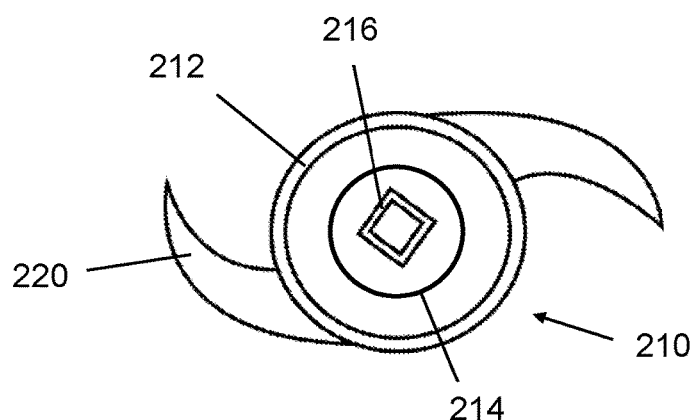
Figure 1
Figure 2

ADJUSTABLE FOOD PROCESSING SYSTEM

CROSS-REFERENCE TO RELATED APPLICATIONS

This application claims priority to U.S. Provisional Patent Application Ser. No. 63/074,618, filed Sep. 25, 2020. The contents of this application are hereby incorporated by reference in their entirety.

BACKGROUND OF THE INVENTION

The combined food blender and food mixer market size was valued at more than $2 billion in 2019 and is expected to continue to grow into the foreseeable future. Related devices are becoming ubiquitous across most residential households. Generally speaking, food blenders and food mixers are multipurpose appliances that may be used in the various applications including home cooking, professional food preparation, emulsification processes, food processing techniques, laboratory applications and the like.

Ideally, blenders and mixers are designed to evenly combine food ingredients into a smooth and consistent texture. The size, speed and power with which the blender operates depends upon its desired application. In operation, a blender rotates a metal blade at the bottom of a container, where the blade is powered by an electric motor at its base that the container couples to. Blenders may be utilized to cut or mix solid foods, liquid foods, semisolid foods and the like.

The most common issues found across existing blenders involve the inability to effectively blend the food items therein into a smooth and consistent texture. This often happens when the food items being blended are non-liquid and therefore are prone to stick to the walls of the container. This causes the portion of food items sticking to the walls to evade the rotating blade while the portion of food items not sticking to the walls gets blended by the rotating blade. Consequently, the resulting batch of processed food items contains both unblended and blended portions which provides a choppy and discontinuous texture. This is disadvantageous for the user.

In order to solve this issue, users will commonly remove the container from the base and shake the food items therein back towards the rotating blade for additional blending. However, this solution is often short-lived as the rotating blade simply disperses a portion of the food items back onto the walls of the container upon resuming blending. Other solutions involved a pause in blending and using a spatula or the like to move the food items back toward the blade. This solution is lacking for the same reasons in that the blade simply disperses a portion of the food items back onto the walls of the container upon resuming blending.

Other solutions not requiring the pause of blending involve the user picking up the blender including container and base while the blade is in operation and shaking the unit to manipulate the food items off the walls and back to the blade. However, this solution can cause the electric motor or shaft elements coupling thereto to become misaligned or otherwise less effectively operable or inoperable altogether. Additionally, such a solution is dangerous to the user and requires upper body strength that not every user possesses.

In some embodiments, the present invention advantageously solves these problems by allowing a user to vertically adjust the rotating metal blade along a vertical axis running through the center of the container. The user may vertically adjust the blade while the blade is rotating in operation. In use, the user may grasp a top of a shaft coupled to the blade and manipulate the entire shaft up and down along a complimentary vertical shaft structure.

In some embodiments, the present invention advantageously allows the user to vertically adjust the rotating blade while it is in operation from the bottom of the container towards the uppermost extent of the container. This allows the user to pass the blade up and down through vertical levels of the food items in order to advantageously provide more evenly chopped-to-size or blended food items. However, the blade may not be allowed to be vertically raised so high as to begin abrading a lid of the container but rather a buffer mechanism may advantageously be used to prevent abrasion from occurring.

In some embodiments, the present invention advantageously allows robust long-term operation of the blender even while the blade is raised vertically towards the lid of the container. Additionally, the lid of the container may advantageously comprise an aperture and sheath that acts as a guide for the elongate shaft to be vertically manipulated therealong while preventing the blended food items from leaking therefrom. Further, the blade may advantageously be raised vertically high enough so as to allow removal from the elongate shaft of the blender and replaced by another blade as desired by the user.

BRIEF DESCRIPTION OF THE DRAWINGS

FIG. 1 is a partial cross-sectional view of an elongate shaft of an adjustable food processing system in accordance with some embodiments of the present invention.

FIG. 2 is a bottom planar view of an elongate shaft of an adjustable food processing system in accordance with some embodiments of the present invention.

DETAILED DESCRIPTION OF THE INVENTION

Figure 3:
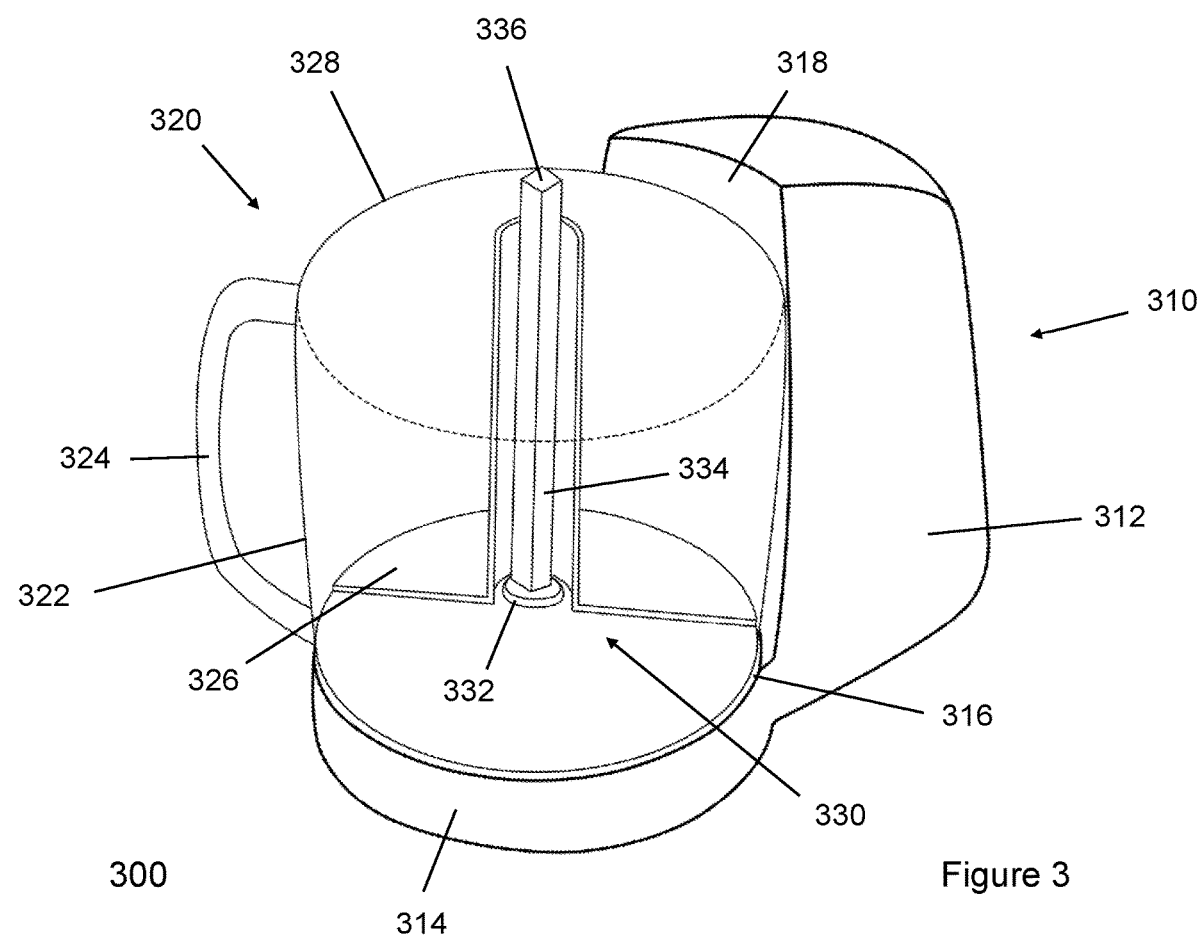
FIG. 3 is a perspective partial cross-sectional view of a base, container and elongate shaft of an adjustable food processing system in accordance with some embodiments of the present invention.

Before describing the present invention in detail, it is to be understood that the invention is not limited to any one of the particular embodiments, which of course may vary. It is also to be understood that the terminology used herein is for the purpose of describing particular embodiments only, and therefore is not necessarily intended to be limiting. As used in this specification and the appended claims, terms in the singular and the singular forms "a," "an," and "the" include plural referents unless the context clearly dictates otherwise. Thus, for example, reference to "an adjustable food processing system" also includes a plurality of adjustable food processing systems and the like.

In some embodiments, an adjustable food processing system is provided comprising a food item container comprising a drive shaft sheath; an elongate shaft comprising a drive shaft cavity disposed therein, wherein: a handling knob is disposed upon the elongate shaft, and the drive shaft cavity is disposed along a common vertical axis; a drive mechanism comprising a drive shaft, wherein: the drive shaft is shaped complimentary to a shape of the drive shaft cavity, and the drive shaft is disposed along the common vertical axis; and a lid comprising an aperture centered about the common vertical axis.

In some embodiments, the drive shaft sheath comprises a horizontal portion and a vertical portion; the horizontal portion defines a bottom surface of the food item container; and the vertical portion extends vertically from the horizontal portion at least as high as an opening of the lid.

In some embodiments, the drive shaft cavity comprises a shape that is triangular, rectangular, pentagonal, hexagonal, cross-shaped, x-shaped or any combination thereof.

In some embodiments, the handling knob comprises an inner cylindrical cavity and a bushing disposed within the inner cylindrical cavity.

In some embodiments, the handling knob and the bushing rotate independently relative rotation of the drive shaft, the drive shaft cavity and the elongate shaft.

In some embodiments, the handling knob rotates independently relative rotation of the elongate shaft.

In some embodiments, the lid comprises a sealing ring disposed about a perimeter edge of the aperture.

In some embodiments, the elongate shaft forms a low-friction fluidic seal with the sealing ring.

In some embodiments, the elongate shaft maintains the low-friction fluidic seal with the sealing ring as the elongate shaft moves relative the sealing ring.

In some embodiments, the handling knob is disposed above the lid and the food item container.

In some embodiments, the elongate shaft is disposed through the aperture of the lid.

In some embodiments, the handling knob comprises a concave side contour.

In some embodiments, the elongate shaft comprises an outer lip disposed at a bottom portion thereof that forms a low-friction fluidic seal with the drive shaft sheath.

In some embodiments, the outer lip maintains the low-friction fluidic seal with the drive shaft sheath as the outer lip moves relative the drive shaft sheath.

In some embodiments, an adjustable food processing system is provided comprising a food item container comprising a drive shaft sheath; an elongate shaft comprising a drive shaft cavity disposed therein, wherein: a handling knob is disposed upon the elongate shaft at a distal portion thereof, the drive shaft cavity is disposed along a common vertical axis, and the elongate shaft comprises an outer lip disposed at a proximal portion thereof; a drive mechanism comprising a drive shaft, wherein: the drive shaft is shaped complimentary to a shape of the drive shaft cavity, and the drive shaft is disposed along the common vertical axis; and a lid comprising an aperture centered about the common vertical axis, wherein: the lid comprises a sealing ring disposed about a perimeter edge of the aperture, the distal portion of the elongate shaft is disposed adjacent the sealing ring when the elongate shaft is in a lowered state, the proximal portion of the elongate shaft is disposed adjacent the sealing ring when the elongate shaft is in a raised state, the distal portion of the elongate shaft remains disposed above the sealing ring when the elongate shaft is in both the lowered state and the raised state, and the proximal portion of the elongate shaft remains disposed below the sealing ring when the elongate shaft is in both the lowered state and the raised state.

In some embodiments, an adjustable food processing system is provided comprising: a food item container comprising a drive shaft sheath; an elongate shaft comprising a drive shaft cavity disposed therein, wherein: a handling knob is disposed upon the elongate shaft at a distal portion thereof, the handling knob comprises an inner cylindrical cavity and a bushing disposed within the inner cylindrical cavity, the drive shaft cavity is disposed along a common vertical axis, and the elongate shaft comprises an outer lip disposed at a proximal portion thereof; a drive mechanism comprising a drive shaft, wherein: the handling knob and the bushing rotate independently relative rotation of the drive shaft, the drive shaft cavity and the elongate shaft, the drive shaft is shaped complimentary to a shape of the drive shaft cavity, and the drive shaft is disposed along the common vertical axis; and a lid comprising an aperture centered about the common vertical axis, wherein: the lid comprises a sealing ring disposed about a perimeter edge of the aperture, the distal portion of the elongate shaft is disposed adjacent the sealing ring when the elongate shaft is in a lowered state, and the proximal portion of the elongate shaft is disposed adjacent the sealing ring when the elongate shaft is in a raised state.

Exemplary embodiments of the present invention are illustrated in the accompanying figures. As shown in FIG. 1, a partial cross-sectional view of an elongate shaft 100 of an adjustable food processing system is provided. The elongate shaft 100 may comprise a shaft body 110, a distal end portion 120, and a proximal base portion 130.

The shaft body 110 may comprise an outer shell 112 which is hollow and defines a cavity therein. The cavity may comprise a drive shaft cavity 114 disposed therein at a position that is centered within the outer shell 112. Further, both the outer shell 112 and the drive shaft cavity 114 may be aligned along a common vertical axis. The vertical axis may run vertically through the center points along the length of the outer shell 112 and the drive shaft cavity 114. While the drive shaft cavity 114 is shown in FIG. 1 to be generally rectangular in shape, any suitable shape may be utilized including, but not limited to, triangular, cross-shaped, x-shaped, pentagonal, hexagonal and the like. The shaft body 110 may comprise a shape corresponding to that of the drive shaft cavity 114.

The distal end portion 120 may comprise a cylindrical coupling mechanism 122 for coupling an adjustment knob (not shown) thereto. Specifically, the cylindrical coupling mechanism 122 may comprise a cylindrical cavity 124 formed therein for receiving a coupling element (not shown) therein. The cylindrical cavity 124 may comprise a plurality of threads 126 formed therein in order to receive a complimentary threaded bolt or other like coupling element (not shown).

The cylindrical coupling mechanism 122 may be structurally continuous with the outer shell 112 of the shaft body 110. Further, the cylindrical coupling mechanism 122 may secure the distal portion of the drive shaft cavity 114 to the remainder of the outer shell 112 for the shaft body 110. Generally speaking, the distal end portion 120 may be structurally continuous with the shaft body 110.

The proximal base portion 130 may comprise a blade retention element 132 that may be coupled to a proximal portion of the outer shell 112 of the shaft body 110. Further, the blade retention element 132 may comprise a plurality of processing blades 134 coupled therein. Specifically, the plurality of processing blades 134 may extend horizontally from the blade retention element 132 in a direction orthogonal to the common vertical axis of the elongate shaft 110.

The blade retention element 132 may be structurally discontinuous from the outer shell 112 of the shaft body 110 and removably coupled thereto. Further, the blade retention element 132 may be permanently coupled to the plurality of processing blades 134 and therefore may allow the entirety of the proximal base portion 130 to be removably coupled to the outer shell 112 of the shaft body 110, thereby allowing a different set of processing blades to be coupled to the elongate shaft 100 in a modular manner as desired by an operator of the adjustable food processing system.

As shown in FIG. 2, a bottom planar view of an elongate shaft 200 of an adjustable food processing system is provided. The elongate shaft 200 may comprise a base portion 210 with a plurality of processing blades 220 coupled thereto in a circumferential manner. However, the processing blades 220 may be coupled to the base portion 210 in any suitable arrangement that still allows permanent coupling of the processing blades 220.

The base portion 210 may comprise an outer lip 212 that may be disposed at a perimeter edge of a blade retention element and may extend outwardly from an outer shell 214 of the base portion 210. The outer shell 214 may be hollow and define a cavity therein. The cavity may comprise a drive shaft cavity 216 disposed therein at a position that is centered within the outer shell 214. Both the outer shell 214 and the drive shaft cavity 216 may be aligned along a common vertical axis. The vertical axis may run vertically through the center points along the length of the outer shell 214 and the drive shaft cavity 216.

Further, the outer lip 212 may be structured in such a way as to prevent processed food items from entering within the outer shell 214 cavity and the drive shaft cavity 216. Specifically, when the outer shell 214 is disposed around a drive shaft sheath (not shown), the outer lip 212 may manipulate processed food items away from the contact point between the outer shell 214 and the drive shaft sheath as the base portion 210 is adjusted vertically up and down along the drive shaft sheath. Moreover, the outer lip 212 may form and maintain a low-friction fluidic seal with the drive shaft sheath as the outer lip 212 moves relative the drive shaft sheath. In some embodiments, one or more elements of the adjustable food processing system and associated elongate shaft 200 may be manipulated manually by a user between a raised state and a lowered state. The low-friction fluidic seal may be maintained while the one or more elements of the adjustable food processing system is manipulated between the raised and lowered states.

Specifically, the outer lip 212 may extend from the outer shell 214 to the perimeter edge of the blade retention element at an angle relative a horizontal axis of the elongate shaft 200. The angle may be at an incline or decline relative the horizontal axis but is preferably within the range of −30 degrees to 30 degrees relative the horizontal axis, but more preferably within the range of −15 degrees to 15 degrees. A greater angle relative the horizontal will allow greater manipulation of the processed food items away from the contact point between the outer shell 214 and the drive shaft sheath as the base portion 210 is adjusted vertically up and down along the drive shaft sheath. A lesser angle relative the horizontal will allow the entirety of the base portion 210 to extend further down along the drive shaft sheath before hitting the bottom of an associated food processing container, thereby allowing the processing blades 220 to more effectively process food items disposed at a bottom portion of the container.

As shown in FIG. 3, a perspective partial cross-sectional view of a base 310, container 320 and drive mechanism 330 of an adjustable food processing system 300 is provided. The base 310 of the adjustable food processing system 300 may support the container 320 and the drive mechanism 330. Each of the base 310, container 320 and drive mechanism 330 may be structurally unitary with one another or may be distinct operable parts that may operably coupled together but removable from one another as desired by the operator of the adjustable food processing system 300.

The base 310 may comprise a housing 312 encasing a drive motor along with various other electronic components. The housing 312 may comprise a support 314 for operably coupling to the drive motor and the drive mechanism 330. Further, the support 314 may comprise a planar platform 316 allowing operable coupling of the container 320 to the support 314 and associated drive motor and drive mechanism 330. The housing 312 may further comprise a concave panel 318 that conforms to the cylindrical shape of the container 320.

The container 320 may comprise a generally cylindrical containing panel 322 for retaining processed food items therein. The containing panel 322 may comprise a handle 324 coupled thereto to allow for an operator to securely move the container 320 filled with processed and non-processed food items. Further, the container 320 may comprise a drive shaft sheath 326 that comprises horizontal and vertical portions. The horizontal portion of the drive shaft sheath 326 may or may not be structurally unitary with a bottom portion of the container 320 and a bottom portion of the containing panel 322. The drive shaft sheath 326 contains the processed food items within the containing panel 322 and prevents the processed food items from entering the cavity within the vertical portion of the drive shat sheath 326 adjacent the drive mechanism 330. Additionally, the containing panel 322 may comprise a lid opening 328 disposed at a top portion thereof for accepting a lid (not shown).

The drive mechanism 330 may comprise a support flange 332 that operably couples the drive mechanism 330 to a drive motor and associated mechanical elements contained within the housing 312 of the base 310. The support flange 332 may couple directly to a drive shaft 334 at a proximal end. The drive shaft 334 may comprise a terminal end 336 disposed at a distal end thereof as shown in FIG. 3. The support flange 332 and the drive shaft 334 may be disposed along a common vertical axis that is centered about the vertical dimension of the drive shaft 334 and drive shaft sheath 326 as shown in FIG. 3.

In operation, an elongate shaft (not shown), such as that of FIG. 1, may be placed over the drive shaft sheath 326 and the drive shaft 334. This action allows an outer shell of the elongate shaft to engage the drive shaft sheath 326 and a drive shaft cavity of the elongate shaft to engage the drive shaft 334. In turn, the drive shaft 334 may be operably coupled to a base portion (not shown) of the elongate shaft, such as that of FIG. 2, and the processing blades associated therewith.

In such a configuration, the drive motor may provide torque to the processing blades via the drive shaft 334 and thereby allow processing of food items placed within the containing panel 322. Further, in this configuration the elongate shaft may be allowed to move up and down the vertical extent of the drive shaft sheath 326 and thereby allow the processing blades to process food items disposed within any volumetric segment along the vertical extent of the containing panel 322 of the container 320.

Figure 4:
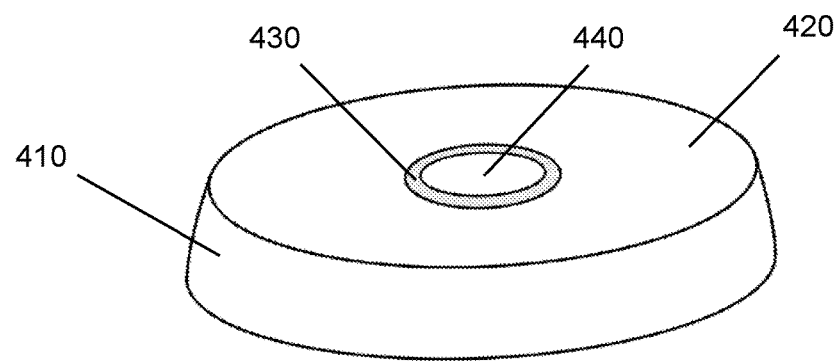
FIG. 4 is a perspective view of a lid of an adjustable food processing system in accordance with some embodiments of the present invention.

As shown in FIG. 4, a perspective view of a lid 400 of an adjustable food processing system is provided. The lid 400 may comprise an outer flange 410 that is designed to structurally conform to a vertical containing panel (not shown) of a container, such as that of FIG. 3, in order to seamlessly couple thereto for proper operation of the adjustable food processing system. The outer flange 410 may be structurally continuous with a planar ceiling 420 that is designed to retain processed food items contained therebeneath in the containing panel.

The planar ceiling 420 may comprise an aperture 440 formed therein at a focal point of the generally circular shape of the planar ceiling 420 as shown in FIG. 4. Further, a low-friction sealing ring 430 may be disposed at the inner terminus of the planar ceiling 420 and at the beginning of the aperture 440. The sealing ring 430 allows an elongate shaft, such as that of FIG. 1, to freely traverse up and down the vertical extent of a drive mechanism, such as that of FIG. 3, in a low-friction fluidically-sealed manner. Such a configuration allows a plurality of processing blades to process food items disposed within any volumetric segment along the vertical extent of the containing panel of the container without leaking the contents therein. In some embodiments, one or more elements of the adjustable food processing system may be manipulated manually by a user between a raised state and a lowered state. The low-friction fluidic seal may be maintained while the one or more elements of the adjustable food processing system is manipulated between the raised and lowered states.

Figure 5:
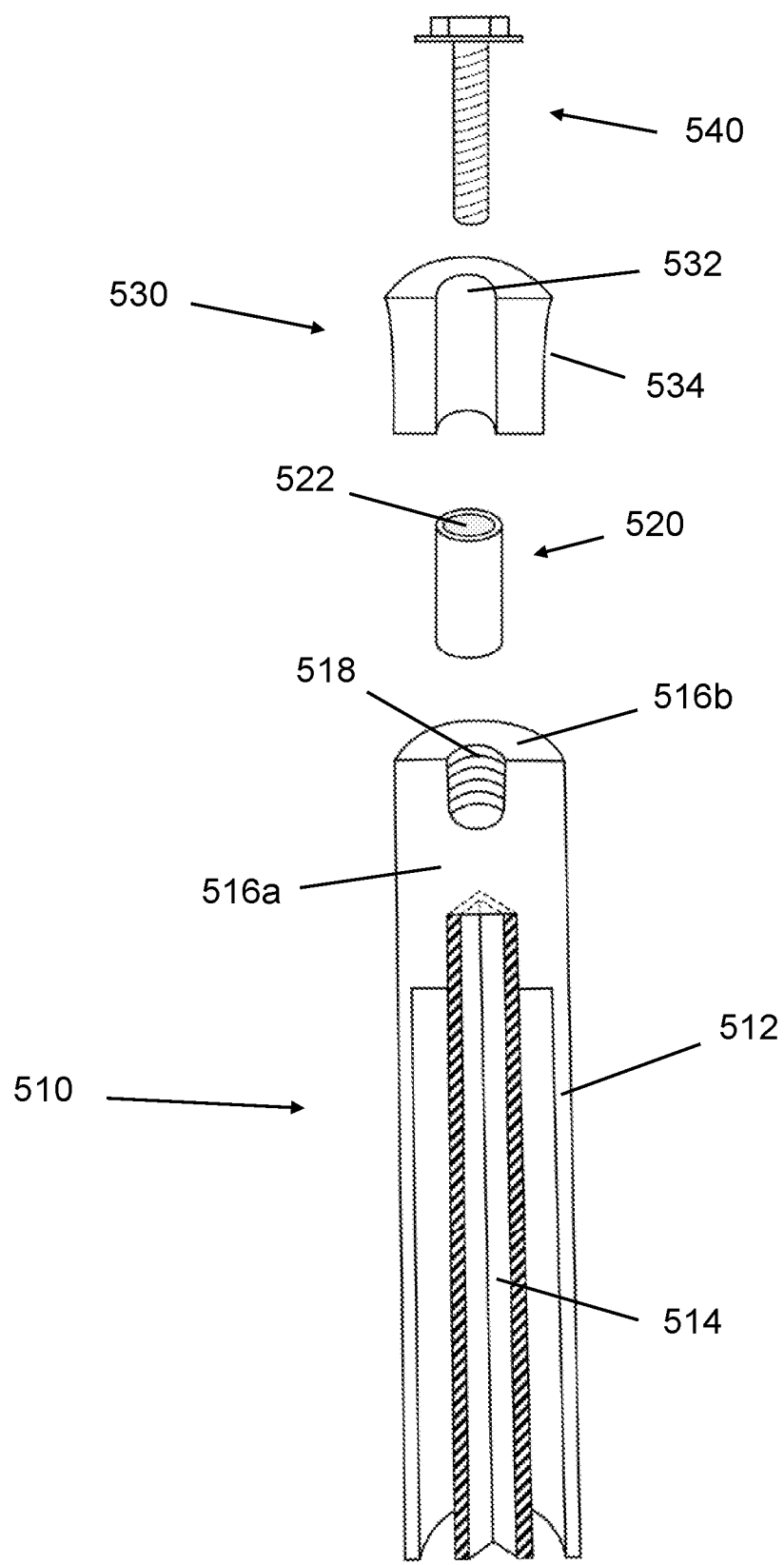
FIG. 5 is an exploded partial cross-sectional view of an elongate shaft of an adjustable food processing system in accordance with some embodiments of the present invention.

As shown in FIG. 5, an exploded partial cross-sectional view of an elongate shaft 500 of an adjustable food processing system is provided. The elongate shaft 500 may comprise a shaft body 510, a press fit bushing 520, a textured handling knob 530 and a coupling mechanism 540. Each of the shaft body 510, the press fit bushing 520, the handing knob 530 and the coupling mechanism 540 may be structurally unitary with each other in whole or in part or, as illustrated in FIG. 5, may be structurally discontinuous from one another in whole or in part.

The shaft body 510 may comprise an outer shell 512 which is hollow and defines a cavity therein. The cavity may comprise a drive shaft cavity 514 disposed therein at a position that is centered within the outer shell 512. Further, both the outer shell 512 and the drive shaft cavity 514 may be aligned along a common vertical axis. The vertical axis may run vertically through the center points along the length of the outer shell 512 and the drive shaft cavity 514.

The shaft body 510 may further comprise a distal end portion having a solid cylindrical portion 516a and a planar top surface 516b. The distal end portion may comprise a threaded cavity 518 for coupling an adjustment knob 530 thereto. Specifically, the cylindrical portion 516a and the planar top surface 516b may comprise the thread cavity 518 formed therein for receiving an associated threaded coupling element 540 therein.

The bushing 520 may comprise an aperture 522 disposed therethrough for allowing the coupling element 540 to pass therethrough. Further, the bushing 520 may be disposed within a cavity 532 of the handling knob 530, thereby allowing the handling knob 530 to rotate independently relative the drive motor-driven rotation of the elongate shaft 510 and the coupling mechanism 540. Such a configuration allows an operator of the adjustable food processor system to grasp the handling knob 530 and manipulate the elongate shaft 510 up and down the vertical extent of a drive shaft sheath, such as that of FIG. 3.

The handling knob 530 may comprise a concave contour 534 that provides increased gripping ability for the operator of the adjustable food processor system. Further, the bushing 520, handling knob 530 and/or coupling mechanism 540 may comprise one or more low-friction materials and/or lubrication elements in order to reduce rotation friction between the non-rotating elements of the bushing 520 and the handling knob 530 and the rotating elements of the elongate shaft 510 and the coupling mechanism 540.

In some embodiments of FIGS. 1-5, the term low-friction refers to the ability of a first structural element of the adjustable food processing system to move relative a second structural element of the adjustable food processing system in a vertical direction along the common vertical access while still abutting one another with enough sealing force that a threshold sealing force is met, i.e. so that the fluidic seal is maintained. Such a configuration would not be possible if a low-friction material were not utilized for the first and second structural element. In some embodiments of FIGS. 1-5, the term low-friction may refer to a threshold being satisfied for a coefficient of friction between the materials of the first and second structural elements.

Further, in some embodiments of FIGS. 1-5, one or more elements of the adjustable food processing system may be manipulated manually by a user between a raised state and a lowered state. The low-friction fluidic seal may be maintained while the one or more elements of the adjustable food processing system is manipulated between the raised and lowered states. For instance, a distal portion of the elongate shaft of FIGS. 1, 2 and 5 may be disposed adjacent the sealing ring when the elongate shaft is in a lowered state. Further, a proximal portion of the elongate shaft of FIGS. 1, 2 and 5 may be disposed adjacent the sealing ring when the elongate shaft is in a raised state.

Additionally, in some embodiments of FIGS. 1-5, a distal portion of the elongate shaft of FIGS. 1, 2 and 5 may remain disposed above the sealing ring of FIG. 4 when the elongate shaft is in both a lowered state and a raised state relative the remaining stationary structural elements of the adjustable food processing system. Moreover, a proximal portion of the elongate shaft of FIGS. 1, 2 and 5 may remain disposed below the sealing ring of FIG. 4 when the elongate shaft is in both the lowered state and the raised state. The low-friction fluidic seal may be maintained while the one or more elements of the adjustable food processing system is manipulated between the raised and lowered states.

The specification and drawings are to be regarded in an illustrative rather than a restrictive sense. However, it will be evident that various modifications and changes may be made thereunto without departing from the broader spirit and scope of the invention as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," "the," and similar referents in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, although above-described elements may be described in the context of certain embodiments of the specification, unless stated otherwise or otherwise clear from context, these elements are not mutually exclusive to only those embodiments in which they are described; any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

The invention claimed is:
1. An adjustable food processing system, comprising:
   a food item container comprising a drive shaft sheath;
   an elongate shaft comprising a drive shaft cavity disposed therein, wherein:
      a handling knob is disposed upon the elongate shaft at a distal portion thereof, and
      the drive shaft cavity is disposed along a common vertical axis;
   a drive mechanism comprising a drive shaft, wherein:
      the drive shaft is shaped complimentary to a shape of the drive shaft cavity, and
      the drive shaft is disposed along the common vertical axis; and
   a lid comprising an aperture centered about the common vertical axis.

2. The adjustable food processing system of claim 1, wherein:
   the drive shaft sheath comprises a horizontal portion and a vertical portion;
   the horizontal portion defines a bottom surface of the food item container; and
   the vertical portion extends vertically from the horizontal portion at least as high as an opening of the lid.

3. The adjustable food processing system of claim 1, wherein the drive shaft cavity comprises a shape that is triangular, rectangular, pentagonal, hexagonal, cross-shaped, x-shaped or any combination thereof.

4. The adjustable food processing system of claim 1, wherein the handling knob comprises an inner cylindrical cavity and a bushing disposed within the inner cylindrical cavity.

5. The adjustable food processing system of claim 4, wherein the handling knob and the bushing rotate independently relative rotation of the drive shaft, the drive shaft cavity and the elongate shaft.

6. The adjustable food processing system of claim 1, wherein the handling knob rotates independently relative rotation of the elongate shaft.

7. The adjustable food processing system of claim 1, wherein the lid comprises a sealing ring disposed about a perimeter edge of the aperture.

8. The adjustable food processing system of claim 7, wherein the elongate shaft forms a low-friction fluidic seal with the sealing ring.

9. The adjustable food processing system of claim 8, wherein the elongate shaft maintains the low-friction fluidic seal with the sealing ring as the elongate shaft moves relative the sealing ring.

10. The adjustable food processing system of claim 8, wherein the low-friction fluidic seal defines a coefficient of friction between the elongate shaft in contact with the sealing ring that is below a threshold coefficient of friction.

11. The adjustable food processing system of claim 8, wherein the low-friction fluidic seal defines a sealing force between the alginate shaft in contact with the sealing ring that is above a threshold sealing force.

12. The adjustable food processing system of claim 1, wherein the handling knob is disposed above the lid and the food item container.

13. The adjustable food processing system of claim 1, wherein the elongate shaft is disposed through the aperture of the lid.

14. The adjustable food processing system of claim 1, wherein the handling knob comprises a concave side contour.

15. The adjustable food processing system of claim 1, wherein the elongate shaft comprises an outer lip disposed at a proximal portion thereof that forms a low-friction fluidic seal with the drive shaft sheath.

16. The adjustable food processing system of claim 15, wherein the outer lip maintains the low-friction fluidic seal with the drive shaft sheath as the outer lip moves relative the drive shaft sheath.

17. The adjustable food processing system of claim 1, wherein:
the elongate shaft comprises an outer lip disposed at a proximal portion thereof;
the lid comprises a sealing ring disposed about a perimeter edge of the aperture;
the distal portion of the elongate shaft is disposed adjacent the sealing ring when
the elongate shaft is in a lowered state; and
the proximal portion of the elongate shaft is disposed adjacent the sealing ring when the elongate shaft is in a raised state.

18. The adjustable food processing system of claim 17, wherein:
the distal portion of the elongate shaft remains disposed above the sealing ring when the elongate shaft is in both the lowered state and the raised state; and
the proximal portion of the elongate shaft remains disposed below the sealing ring when the elongate shaft is in both the lowered state and the raised state.

19. An adjustable food processing system, comprising:
a food item container comprising a drive shaft sheath;
an elongate shaft comprising a drive shaft cavity disposed therein, wherein:
a handling knob is disposed upon the elongate shaft at a distal portion thereof,
the drive shaft cavity is disposed along a common vertical axis, and
the elongate shaft comprises an outer lip disposed at a proximal portion thereof;
a drive mechanism comprising a drive shaft, wherein:
the drive shaft is shaped complimentary to a shape of the drive shaft cavity, and
the drive shaft is disposed along the common vertical axis; and
a lid comprising an aperture centered about the common vertical axis, wherein:
the lid comprises a sealing ring disposed about a perimeter edge of the aperture,
the distal portion of the elongate shaft is disposed adjacent the sealing ring when the elongate shaft is in a lowered state,
the proximal portion of the elongate shaft is disposed adjacent the sealing ring when the elongate shaft is in a raised state,
the distal portion of the elongate shaft remains disposed above the sealing ring when the elongate shaft is in both the lowered state and the raised state, and
the proximal portion of the elongate shaft remains disposed below the sealing ring when the elongate shaft is in both the lowered state and the raised state.

20. An adjustable food processing system, comprising:
a food item container comprising a drive shaft sheath;
an elongate shaft comprising a drive shaft cavity disposed therein, wherein:
a handling knob is disposed upon the elongate shaft at a distal portion thereof,
the handling knob comprises an inner cylindrical cavity and a bushing disposed within the inner cylindrical cavity,
the drive shaft cavity is disposed along a common vertical axis, and
the elongate shaft comprises an outer lip disposed at a proximal portion thereof;
a drive mechanism comprising a drive shaft, wherein:
the handling knob and the bushing rotate independently relative rotation of the drive shaft, the drive shaft cavity and the elongate shaft,
the drive shaft is shaped complimentary to a shape of the drive shaft cavity, and
the drive shaft is disposed along the common vertical axis; and
a lid comprising an aperture centered about the common vertical axis, wherein:
the lid comprises a sealing ring disposed about a perimeter edge of the aperture,
the distal portion of the elongate shaft is disposed adjacent the sealing ring when the elongate shaft is in a lowered state, and
the proximal portion of the elongate shaft is disposed adjacent the sealing ring when the elongate shaft is in a raised state.

* * * * *